United States Patent [19]

Tsuyoshi et al.

[11] Patent Number: 5,132,854
[45] Date of Patent: Jul. 21, 1992

[54] HIGH SPEED SEEK SECTOR SERVO MAGNETIC DISK DRIVE UNIT

[75] Inventors: Toshiaki Tsuyoshi, Kawasaki; Yosuke Seo, Sagamihara; Hajime Aoi, Tachikawa, all of Japan

[73] Assignee: Hitachi, Ltd., Tokyo, Japan

[21] Appl. No.: 408,197

[22] Filed: Sep. 15, 1989

[30] Foreign Application Priority Data

Sep. 19, 1988 [JP] Japan .................. 63-232359

[51] Int. Cl.$^5$ .............................................. G11B 5/55
[52] U.S. Cl. .............................. 360/78.14; 360/77.08; 360/78.04
[58] Field of Search ................. 360/77.08, 78.04, 78.14

[56] References Cited

U.S. PATENT DOCUMENTS

| | | | |
|---|---|---|---|
| 4,737,869 | 4/1988 | Sugaya et al. | 360/77.08 |
| 4,807,063 | 2/1989 | Moteki | 360/78.04 X |
| 4,809,120 | 2/1989 | Ozawa | 360/78.14 |
| 4,896,228 | 1/1990 | Amakago et al. | 360/77.08 |

FOREIGN PATENT DOCUMENTS

| | | | |
|---|---|---|---|
| 53-76813 | 7/1978 | Japan | 360/78.04 |
| 55-150161 | 11/1980 | Japan | 360/78.14 |
| 60-140584 | 7/1985 | Japan | 360/78.04 |
| 60-193176 | 10/1985 | Japan | 360/78.04 |

OTHER PUBLICATIONS

IBM Tech. Disc. Bulletin, vol. 17, No. 6, Nov. 1974, Correction of Data Track Misregistration in Servo Controlled Disk Files, A. Paton, pp. 1781–1783.

*Primary Examiner*—Aristotelis Psitos
*Assistant Examiner*—David L. Robertson
*Attorney, Agent, or Firm*—Antonelli, Terry, Stout & Kraus

[57] ABSTRACT

A disk drive unit is disclosed, which comprises a recording medium having more than two disk-shaped recording faces disposed on each other with an interval; information tracks disposed along the periphery on the more than two recording faces and servo signal fields on the recording faces, in the peripheral direction for different recording faces; more than two heads reading out servo information from the servo signal fields on the more than two recording faces; head moving means for moving the heads in the radial direction of the recording faces, linked with each other; means for obtaining position signals on the recording faces at different points of time for different heads on the basis of the servo signals; means for obtaining information on the relative velocity of the heads to the recording faces from the position signals at different points of time for different recording faces, and control means for effecting the velocity control by means of the head moving means on the basis of the information on the relative velocity.

9 Claims, 16 Drawing Sheets

N SECTORS/FACE

M FACES $$\Delta\theta = \frac{360°}{M \cdot N}$$

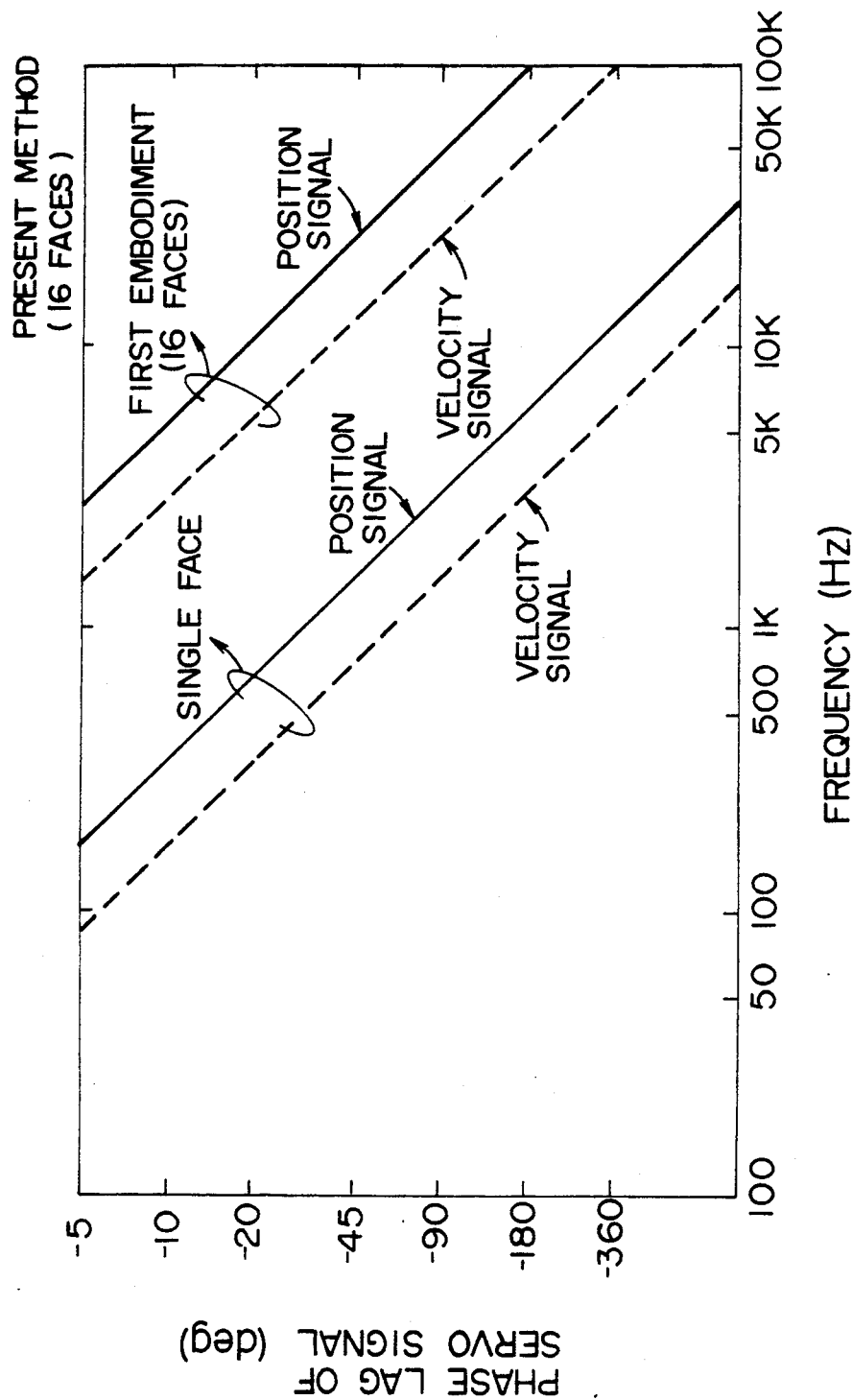

FIG.10

| HEAD | POSITIONAL ERROR OF HEAD |
|---|---|
| A | $\Delta aa$ (0) |
| B | $\Delta ab$ |
| C | $\Delta ac$ |
| D | $\Delta ad$ |
| E | $\Delta ae$ |
| F | $\Delta af$ |
| G | $\Delta ag$ |
| N | |
| O | $\Delta ao$ |
| P | $\Delta ap$ |

HIGH SPEED SEEK SECTOR SERVO MAGNETIC DISK DRIVE UNIT

BACKGROUND OF THE INVENTION

The present invention relates to a disk drive unit and in particular to a disk drive unit capable of high speed seek control.

Recently magnetic disk memory devices called hard disk drive units are widely used. A hard disk drive unit is a memory device, which has a plurality of magnetic heads mounted in one body on a single spindle and a plurality of magnetic disks and which records/reproduces data on the disks by means of the heads. In general, the combinations of the disks and the heads are fixed. On one face of a magnetic disk there are disposed a plurality of spiral or coaxial circular data tracks, on/from which data are recorded/reproduced. At this time, in order to record/reproduce the data correctly, it is necessary for the heads to find a target track among the plurality of tracks and to follow the target track. This operation is called head positioning. In a large hard disk drive a head positioning method called dedicated servo method was used in general. The dedicated servo method is a method, by which a disk face (servo face) and a head (servo head) exclusively used for the head positioning are utilized and data are recorded/reproduced on/from data faces by means of data heads coupled with the servo head, while obtaining a positioning signal through the servo head from the servo face to position the heads. However, since the positioning by the dedicated servo method is effected by an open loop control for the data tracks on the data faces, when the track density is high, even if the servo head follows correctly the track on the servo face, if there are variations in the course of time in the mechanical system due to the thermal expansion, etc. the data heads cannot always trace correctly the center of the data tracks and as the result it can be impossible to record/reproduce correctly the data.

In order to solve this problem, a method called embedded servo method is useful as a method for positioning the heads for the high density tracks. The embedded servo method is a method, by which the tracks on each of the data faces are divided into about 10 to 200 equal sectors and the positioning of the data head on each of the data faces is effected by obtaining intermittently the positioning signal from a servo signal field disposed in a part of each of the sectors. Since this method is effected by a feedback control, by which the servo control is effected on the basis of the positioning signal written in the data track itself, no positional deviations due to the thermal variations in the mechanical system in the course of time take place and therefore this method is useful also for the high density tracks.

However, particularly from the point of view of the control of the velocity of the head, heretofore it was thought that the high velocity control is difficult in the magnetic disk drive unit by the embedded servo method. That is, in the dedicated servo method, special servo pattern signals are recorded almost continuously in each of the tracks on the exclusive servo face, as soon as the magnetic head traverses a track at the access, it can be detected that the head has traversed the track. That is, by the dedicated servo method, since the servo pattern signal varies sinusoidally with a period of one or several tracks at the traverse of the track, it is possible to detect the position of the head by counting the wave number of this sinusoidal signal. And the velocity is the head is detected from the frequency. So the access control can be effected, utilizing it.

On the contrary, by the embedded servo method, since only about 10 to 200 servo signals are disposed intermittently on every track, when the head traverses the track with a high velocity at the access, it can take place that the sinusoidal servo pattern signal cannot be detected correctly because of insufficiency of the number of positioning information samples. In this case, since it is not possible to monitor correctly the position and the velocity of the head, it is not possible to control correctly the position of the head at the access.

In order to solve this problem, a method is known, by which, by the embedded servo method, the address of each track is recorded together by a special modulation method (gray code, etc.) in the servo signal field of each sector apart from the servo pattern signal. By this method, when the head passes through the servo pattern field at the access, the position error signal and the track address are detected simultaneously to know the absolute position of the head on the disk, putting together these two sorts of information. Although this method has a problem that the ratio of the address area is slightly greater, it is a useful method, because it is possible to detect the position and the velocity of the head at the high velocity access by the sector servo method.

The prior art embedded servo method had another serious problem concerning the access, even in the case where the track address such as gray code was used together, as described above. This is a problem concerning the time lag accompanying the sampling of the servo signal. This will be explained below, referring to FIGS. 2a to 2c. In FIG. 2a, the abscissa represents the time t and the ordinate the position of the head, and the full line indicates the real trajectory of the head. By the embedded servo method the position of the head is sampled for every time $\Delta T$ and the value of the signal is zero-order held to produce a stepwise waveform signal. However, it is possible that the component, which is really effective as the servo signal, has a waveform indicated by a broken line obtained by removing the high frequency component due to the sampling from this stepwise waveform. This signal indicated by the broken line has the same waveform as the real trajectory of the head indicated by the full line, but it is retarded by $\Delta T/2$ in average with respect to the latter. Consequently, in the case where this waveform indicated by the broken line is used as the servo signal, the point of time, where the servo system knows really the position of the head at a point of time t, is $t+(\Delta T/2)$. On the other hand, FIG. 2b is a scheme for explaining the time lag, in the case where the velocity of the head is obtained, starting from the head position signal indicated in FIG. 2a. The velocity of the head, which can be detected at a point of time $t_n$ can be obtained by dividing the difference between the position of the head $X(t_n)$ at the point of time $t_n$ and the position of the head $X(t_{n-1})$ at the point of time $t_{n-1}$ by the time $\Delta T$, i.e.

$$V(t_n) = \frac{X(t_n) - X(t_{n-1})}{\Delta T} \tag{1}$$

However, since it can be thought that $V(t_n)$ represents in reality the average velocity between the points of time $t_n$ and $t_{n-1}$, it is possible that the real velocity of the head at the point of time $t_n-(\Delta T/2)$ is detected with a time lag of $\Delta T/2$. Further, since $V(t)$ has a stepwise waveform similarly to the case of the position signal indicated in FIG. 2a, the point of time where $V(t_n)$ is an effective signal is retarded further by $\Delta T/2$. Consequently, for the velocity signal, the point of time where the servo system knows the real velocity of the head at the point of time t is retarded by $\Delta T$, i.e. it is at the point of time $t+\Delta T$.

That is, in the sampling system, whose sampling period is T, since the signal waveform obtained stepwise is filtered to obtain the normal signal waveform, at first a time lag of $\Delta T/2$ is produced and in the velocity detecting system still another time lag of $\Delta T/2$ is produced.

In general the transfer function $G(s)$ of a system having a time lag of T can be expressed by;

$$G(s) = exp(-s \cdot T),$$

where s represents an imaginary frequency in the Laplace transformation. The gain of this transfer function is always 1, but its phase characteristics have a linear retardation with respect to the frequency and the component of the frequency $f=(1/T)$ is retarded by 360°. FIG. 2c shows phase-frequency characteristics of such a transfer function $G(s)$. For example, supposing $T=1$ ms a phase lag of 360° is produced for the 1 kHz component; 180° for 500 Hz; and 90° for 250 Hz. Consequently, supposing that the positioning servo system for the magnetic disk drive unit is designed, in which the sampling frequency is 1 kHz, the upper limits of the required gain crossover frequency are 100 Hz both for the velocity control system and for the position control system, in the velocity control system, since $T=\Delta T=1$ ms, a phase lag of 36° is produced for 100 Hz and in the position control system, since $T=\Delta T/2=0.5$ ms, a phase lag of 18° is produced. Since the phase lag in the servo system lowers generally the stability of the servo system, it is desirable that it is as small as possible.

In particular, in case of seeking, since the head is controlled generally by the velocity control, the phase lag in the velocity controlling system gives rise to a particularly serious problem.

There are known two methods for reducing influences of this phase lag by the embedded servo method i.e. ① by increasing the sampling frequency and ② by decreasing the servo band width. Heretofore the method ② was adopted. However, since it lowers the quick response property to decrease the servo band width, it was not possible to increase remarkably the acceleration of the head driving device and thus it was difficult to increase the seeking speed. On the other hand, in order to increase the sampling frequency, heretofore it was thought that it is necessary to increase the number of sectors (number of servo fields) for every turn of the disk. However increase in the number of sectors means dividing unnecessarily finely user data. Since this gives rise not only to inconveniences in the handling of the data but also to lowering in the efficiency of the data, this method has not used heretofore.

Further, as another method for detecting the velocity, it is possible also to detect the velocity mechanically rather than relying on the information on the disk but mechanically. The representative method uses a tachometer utilizing the principle of the electric generator. However this method has problems that ① it is apt to give rise to an increase cost of the drive unit, that ② the mechanical system is apt to be too heavy and therefore it is disadvantageous for the high velocity access, that ③ the velocity detection precision at the low velocity, which is particularly important, is apt to be low, etc. and therefore in practice it can almost not be used.

SUMMARY OF THE INVENTION

The object of the present invention is to provide a disk drive unit capable of detecting the position and the velocity of the head with a high precision in a sector servo type magnetic disk drive unit and as a result realizing a high velocity access by the embedded servo method.

In order to achieve the above object, a first feature of the present invention is that the information is arranged on a plurality of faces on a same spindle, shifted from each other in the peripheral direction, so that the effective sampling frequency at the access is increased and the velocity detection is effected with a short time lag and a high precision and at the same time the position detection can be effected frequently by sampling sequentially the servo information on this plurality of faces. Further, in above method, since corresponding points on different faces are slightly different in the position in the radial direction because of variations in the course of time, even if they belong to a same cylinder, when the velocity information is calculated, starting from the position information from the plurality of faces, velocity errors can be produced. As a measure for solving this problem, the velocity detection is effected by using the position information coming from a same surface and different sets of the velocity information on the plurality of faces shifted from each other are connected with each other to raise an equivalent sampling frequency of the velocity signal. Another form of realization, the offset amount between different faces is measured for every head at the track following mode and stored in a predetermined memory and a more precise position of the head can be obtained by compensating the position information of the head by means of the values stored in the memory.

On the other hand a second feature of the present invention is that the velocity is obtained by extrapolation by calculation or by using the driving current for the voice coil motor (hereinbelow abbreviated to VCM) in order to reduce influences of the time lag on the velocity information obtained by calculation, starting from intermittent position information obtained from the face of the disk.

Further a third feature of the present invention is that the stepwise waveform of the velocity signal obtained by calculation, starting from intermittent position information obtained from the face of the disk, is smoothed not by means of a low pass filter but by using the driving current for the VCM. In this way the retardation in the phase of the velocity signal is reduced.

Concerning the first feature of the present invention, in the case of a driving unit, in which M surfaces of disks constitute one spindle, one turn of a surface being divided uniformly into N sectors, as indicated in FIG. 3a, the fields of different faces, in which the servo information is written, are arranged so as to be shifted by $\Delta\theta$ ($\Delta\theta = 360°/(M \times N)$) around the rotation axis of the spindle for every face, as indicated in FIG. 3b. The heads for the different faces, which are moved at the access, coupled together, are switched-over sequentially, and the head position information is sampled for every angle $\Delta\theta$ in synchronism with the servo signal field on each disk face.

FIGS. 1a and 1b are schemes for explaining the conception of the heads switching-over at the access in the case where M=4 (2 disks, 4 surfaces) for the sake of simplicity. FIG. 1a shows variations in the current applied to the VCM at moving the head at the access. FIG. 1b shows displacements of the heads moving with the acceleration corresponding to the current and the switching timing for 4 heads, i.e. A, B, C and D, each of them taking charge of one face of the disks. For example, supposing that N=100 and that the rotation velocity of the disks is 60 Hz, $\Delta\theta = 360°/(4\times100) = 0.9°$ and the sampling period $\Delta t$ corresponding to $\Delta\theta$ is $\Delta t = (1/60)/(4\times100) \simeq 41.7$ μsec. That is, the 4 heads are switched-over one after another for every 41.7 μsec to read out the servo signal fields on the faces of the disks and the position of the heads at that time is detected. The head positions read out by these 4 heads are arranged time sequentially to know the head position for every $\Delta t$ as illustrated by the curve indicated by the broken line in FIG. 2b.

It is possible to increase the number of servo signals obtained for every turn of the disks by a factor of M by arranging the servo signal fields on the different surfaces, shifted by $\Delta\theta$ from each other and by obtaining the head position signals by switching-over sequentially the heads in synchronism with the servo signal on the surfaces of the disks. In this way it is possible to raise the sampling frequency for the velocity control loop without increasing unnecessarily the number of sectors for every turn of the disks and thus it is possible to monitor satisfactorily finely the movement of the heads, even if they are moved with a high velocity. As the result, it is possible to assure a great servo frequency band width for the seek control system and to realize a magnetic disk drive unit capable of a high speed response, i.e. a high velocity access.

As described above, it is possible to increase the effective sampling frequency by a factor of M by connecting the position signals coming from a plurality of faces with each other. However, in the case where the relative positions of the plurality of heads linked with each other are slightly deviated from each other in the radial direction on the disks, the detected position information can contain offset amounts different for different faces. More concretely speaking, in the case where the position signals obtained by the heads A to D as indicated in FIG. 1b contain offset amounts different for every head, the velocity information obtained from the basis of the difference therebetween is subjected to influences of the offset amounts and therefore it cannot be detected correctly.

According to the present invention one velocity information is calculated as a difference between different position information coming from a same head and the sampling frequency of the velocity signal is equivalently multiplied by M by connecting velocity signals shifted slightly in time from each other, which are obtained by the M heads. Even in the case where different sets of the position information contain offset, the calculated velocity information contains no influences of the offset by using the method described above.

JP-A-60-140584 can be cited as a publication disclosing the conception that the servo pattern fields are disposed, shifted from each other, for different disk faces, as described according to the present invention. However, in this publication, the cross track by the heads is checked with a high frequency by means of disks, in which the servo information is disposed, shifted for different faces, and a plurality of heads, but this publication does not enclose obtaining the velocity information from a plurality of disk faces.

Further, in JP-A-60-193176, a method is disclosed, by which the sampling frequency of the servo information is increased by a factor of 2 by disposing sectors on the front and the rear side of one disk, shifted by $\frac{1}{2}$ sector from each other. Since the object of the method is a floppy disk, the publication does not disclose utilizing position information from a plurality of disks mounted on a same spindle and no measure is taken against the problem of the offset between different heads.

The operation of the second and the third feature of the present invention is to be able to obtain continuously a quasi velocity signal by integrating the driving current applied to the VCM, because it corresponds to the acceleration of the head. However the bias component of this velocity signal, which corresponds to the integration constant, is undetermined. Therefore the variation component of the signal for a predetermined period of time is taken-out and used as the signal representing variations in the velocity. According to the second feature the driving current for the VCM is used for extrapolating the velocity information in order to reduce the time lag at the detection of the velocity and according to the third feature it is used for smoothing the stepwise signal waveform obtained from the surfaces of the disks.

Furthermore the first, the second and the third feature of the present invention used alone can permit the high speed access, and further it is possible also to obtain excellent effects by using them in combination.

BRIEF DESCRIPTION OF THE DRAWINGS

FIG. 8 is a graph for explaining the effect of the present invention;

FIGS. 9 and 10 are conceptual schemes for explaining the correction, which is to be effected, in the case where there are shifts between different heads;

FIGS. 16b to 16f are conceptual schemes for explaining the still another embodiment of the present invention indicated in FIG. 16a;

FIGS. 17b to 17e are conceptual schemes for explaining the still another embodiment of the present invention indicated in FIG. 17a.

DESCRIPTION OF THE PREFERRED EMBODIMENTS

EMBODIMENT 1

Figure 1A:
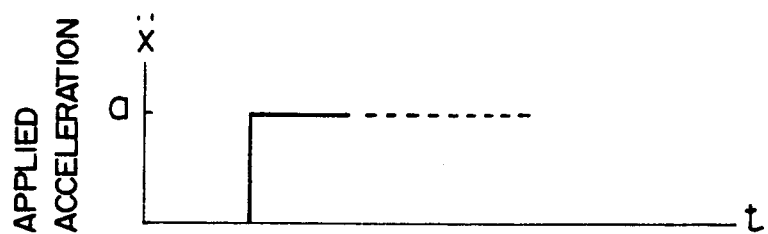
FIGS. 1a and 1b are conceptual schemes for explaining the principle of the present invention.
Figure 1B:
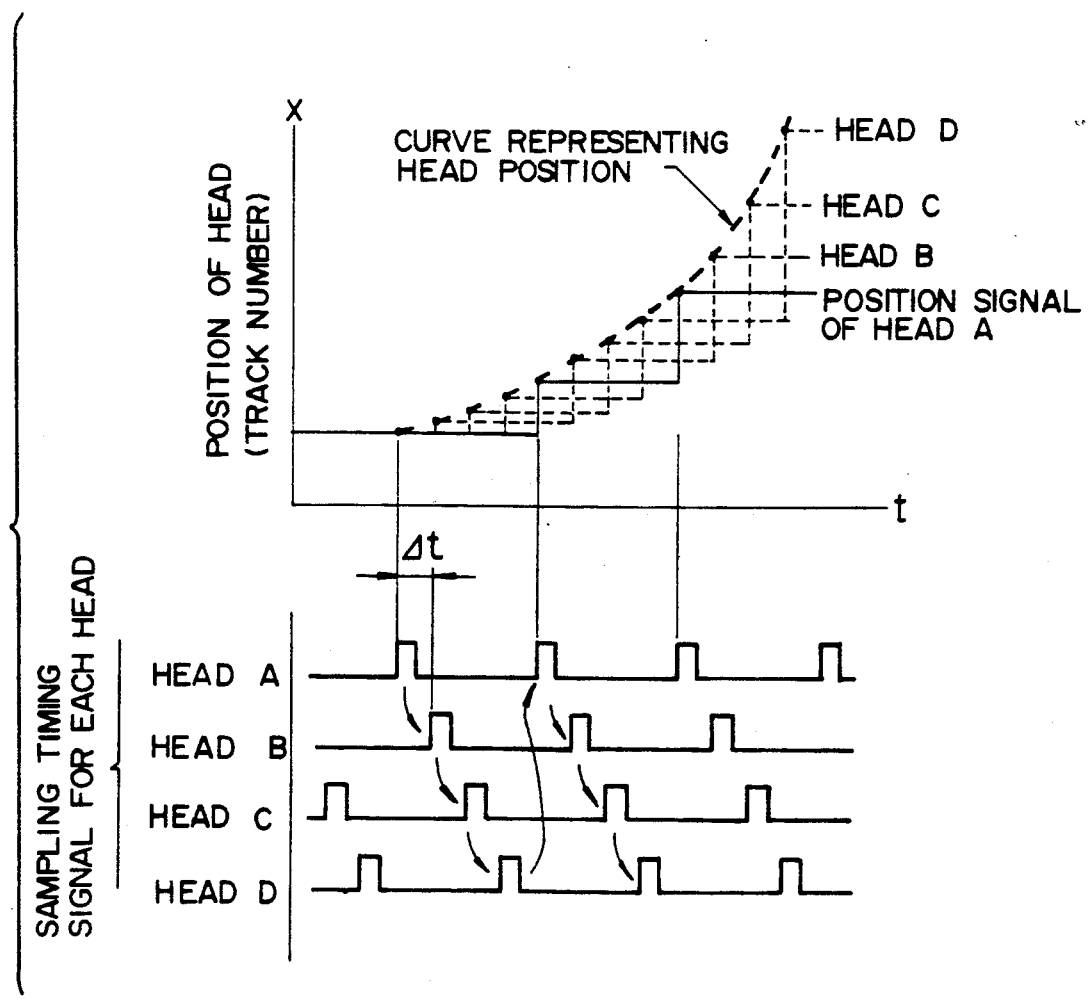

Hereinbelow a detailed embodiment of the present invention will be explained, referring to the drawings. At first an embodiment, whose central point is the first feature of the present invention, will be explained. TABLE 1 shows the system specification of the first embodiment of the present invention.

TABLE 1

| | |
|---|---|
| NUMBER OF SECTORS/TRACK [N] | 100 |
| NUMBER OF DATA FACES [M] | 16 |
| ROTATION VELOCITY OF DISKS | 60 Hz |
| TRACK PITCH | 20 μm |
| SAMPLE (16 FACES) | 10.4 μs |
| PERIOD (SINGLE FACE) | 166.7 μs |
| MAXIMUM VELOCITY, BELOW (16 FACES) | 1.92 m/s |
| WHICH CROSS TRACK IS DETECTABLE (SINGLE) | 0.12 m/s |

Figure 4:
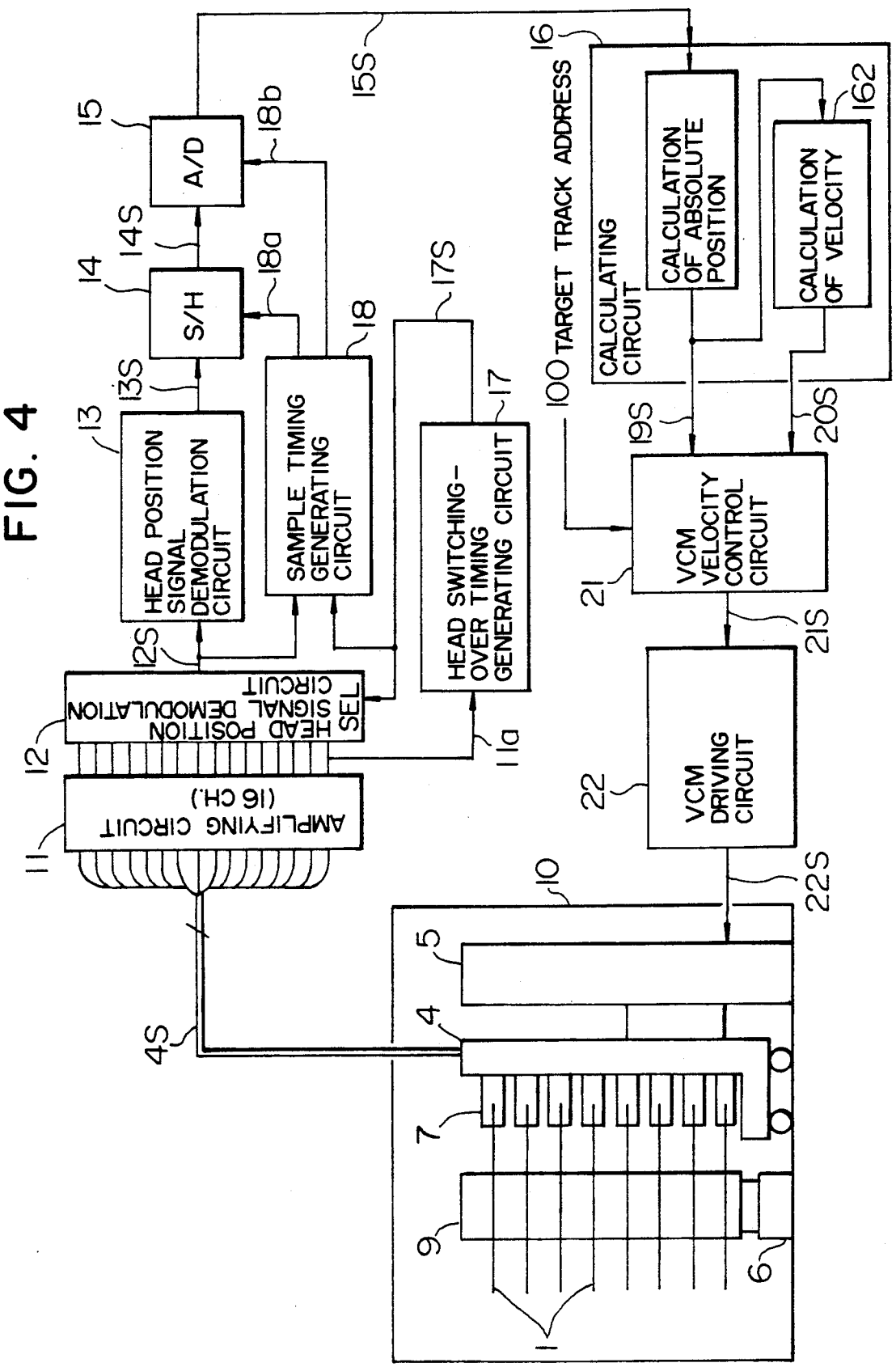
FIG. 4 is a block diagram for explaining the construction of an embodiment of the present invention.

Here it is supposed that the number of disks mounted on one spindle is 8, i.e. there are 16 faces in total (M=16); the number of sectors (servo signal fields) is 100 for every face; the track pitch is 20 μm and the rotation velocity of the disks is 60 Hz. As the result the sampling frequency is 96 kHz for the 16 faces (6 kHz for a single face) and therefore the sampling period is 10.4 μs. Further the present embodiment is an example for realizing an embedded servo type magnetic disk drive unit without including any track address information such as gray code, etc. in the servo signal fields. FIG. 4 illustrates the construction of a disk drive unit according to the present embodiment. The drive unit 10 includes a single spindle 9. The spindle 9 is rotated by a spindle motor 6 and 8 disks 1, i.e. 16 faces secured to the spindle 9 are rotated simultaneously. The drive unit 10 includes further a group of 16 heads 7 for recording/reproducing information on the 16 disk faces secured to a single head carriage 4, a VCM 5, which moves the head carriage 4 in the radial direction of the disks to effect the access, etc. The operation of the circuit system will be explained later. Further, since the present invention relates to the seek by the disk drive unit, the part concerning the recording of information, the control circuit for the following, etc. will be omitted, which are identical to the corresponding parts according to the prior art techniques.

Figure 5:
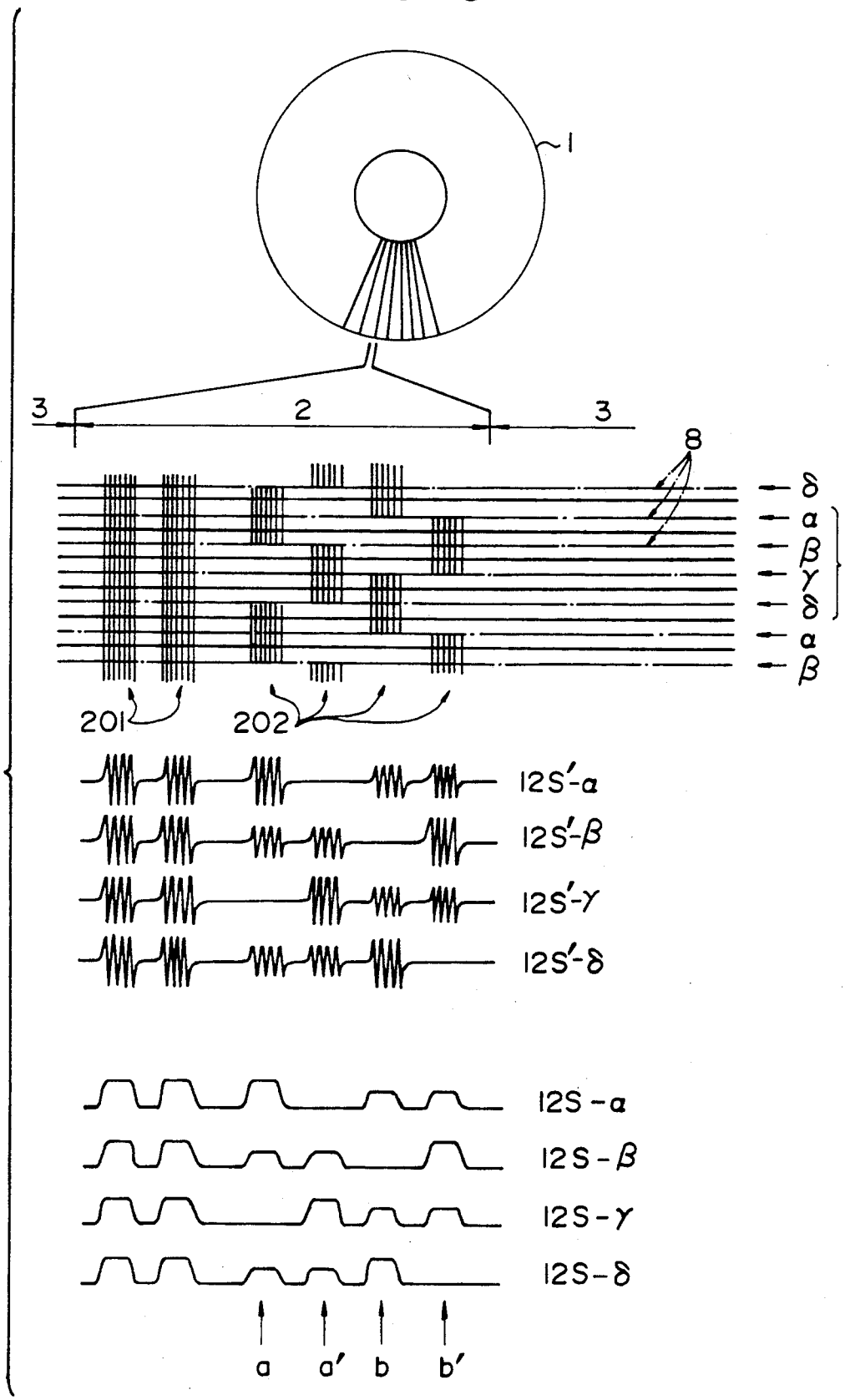
FIG. 5 is a conceptual scheme for explaining an example of the servo pattern in a servo signal field used for realizing the present invention.

FIG. 5 is a scheme for explaining the servo signal pattern on the disks in the present embodiment. On each track there are disposed a servo signal field 2 and a data recording field 3 and in the servo signal field 2 a synchronization signal pattern 201 and a servo signal pattern 202 are previously magnetically recorded. The center lines of the tracks are indicated by dotted lines 8. The synchronization signal pattern 201 is a signal indicating the beginning of the servo signal field. In the servo signal pattern 202, four tracks constitute one pattern. That is, when the magnetic head traverses the track center lines α, β, λ and δ of the four tracks adjacent to each other, read out signal waveforms different from each other, depending on the tracks, as indicated by 12S'-α, 12S'-β, 12S'-γ and 12S'-δ, are obtained. The position error signal can be obtained by sampling the signal level of the envelopes 12S of the signals 12S' at four parts indicated by a, a', b and b' and forming level differences 12S(a)-12S(a') and 12S(b)-12S(b'). That is, in the case where the head is in the neighborhood of the center line of the track α or γ, since the signal levels at b and b' vary with a high sensitivity with respect to track errors, the difference therebetween 12S(b)-12S(b') indicates the error amount and similarly, in the case where the head is in the neighborhood of the center line of the track β or δ, 12S(a)-12S(a') indicates the error amount. Further it is possible to detect in the neighborhood of which track the head is, α, β, γ or δ, and the direction of the position error by comparing the signal levels at the positions a, a', b and b' to know which is The operation of the present embodiment will be explained, referring to FIGS. 6, 4, 7a and 7b. In FIG. 4, information on the disk read out by each of the 16 heads is transformed into an electric signal 4S and one 12S of the 16 signals is selected by a signal switching-over circuit 12, after they have been amplified by an amplifying circuit 11 having 16 channels. The position of the head is detected from the signal 12S by a head position signal demodulation circuit 13 in the form of a signal 13S.

Figure 6:
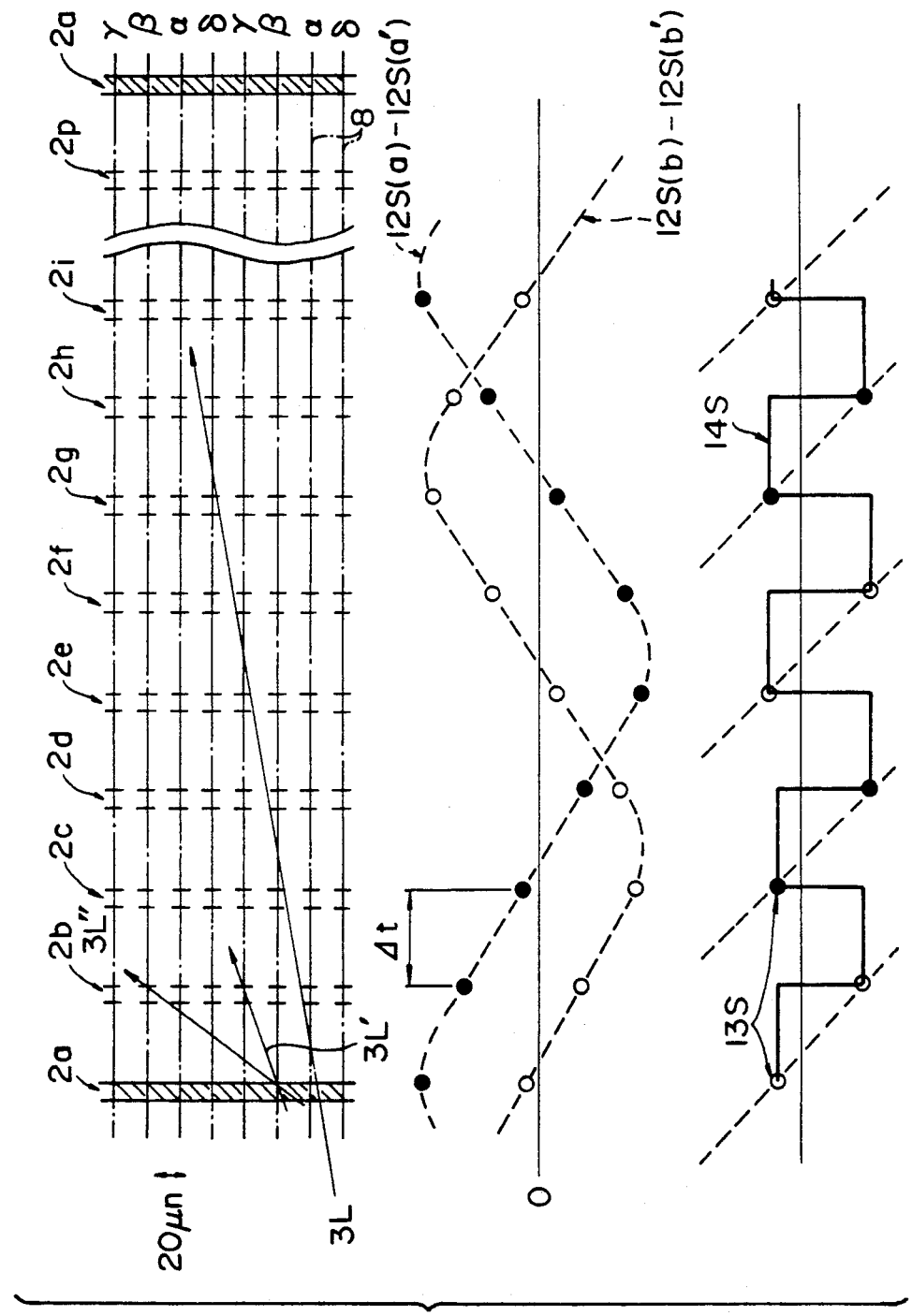
FIG. 6 is a conceptual scheme for explaining the operation of the present invention.

FIG. 6 indicates the servo signal, in the case where the present invention is applied by using the servo signal pattern indicated in FIG. 5. The pattern in the upper part of FIG. 6 indicates the disk face, in the direction perpendicular to the track direction. On the center line 8 of the track there are disposed servo signal fields 2a having a pattern as indicated in FIG. 5. Here 2b, 2c, 2d, - - -, 2p indicated by broken lines indicate the position of the servo signal fields disposed on the other faces, shifted from each other according to the spirit of the present invention. That is, they divide equivalently uniformly the region between two servo sectors 2a–2a adjacent to each other into 16 parts. In this case, the period of time, during which the head traverses one of the 15 regions, into which the region 2a—2a is equivalently uniformly divided, corresponds to the sampling period Δt, which is 10.4 μs in the present embodiment. Further the interval between adjacent tracks is 20 μm. 3L indicates the trajectory of the head moving, while traversing the tracks at the seek. The curves indicated in the middle part of FIG. 6 show 2 kinds of position error signals 12S(a)–12(a') (black circles) and 12S(b)–12S(b') (white circles). Here curves drawn by broken lines show hypothetical continuous position error signals and in the embedded servo method, the position error signals are obtained by sampling these curves in each of the servo fields. The signal 12S(a)–12S(a') is zero on the center lines of the tracks β and δ and the signal 12S(b)–12S(b') is zero on the center lines of the tracks α and γ. For both of them 4 cross tracks correspond to one cycle. The rectangular wave indicated in the lower part of FIG. 6 indicates a head position signal, obtained by taking out linear parts from these two signals and adding the polarity thereto, depending on the tracks α, β, γ and δ. In the figure broken lines show the hypothetical continuous signals, white and black circles are signals 13S outputted really by the head position signal demodulation circuit 13, and the full line indicates an output signal wave 14S after it has been zero-order held by a sample and hold circuit 14.

From the position signal 14S sample-held, the absolute position 19S of the head in the radial direction of the disks and the head velocity 20S transformed into digital data are obtained by calculation by means of an A/D converter 15 indicated in FIG. 4. The absolute position of the head can be obtained by connecting variations in the sign of the sampled position signal (position error signal) one after another, if the track traverse velocity is lower than a predetermined value stated later. Further the head velocity can be calculated by dividing the difference between the head position at the last sampling point and the present position by the sampling period Δt.

The head position 19S and the head velocity 20S thus obtained by the calculation are inputted in a VCM velocity control circuit 21.

Figure 7A:
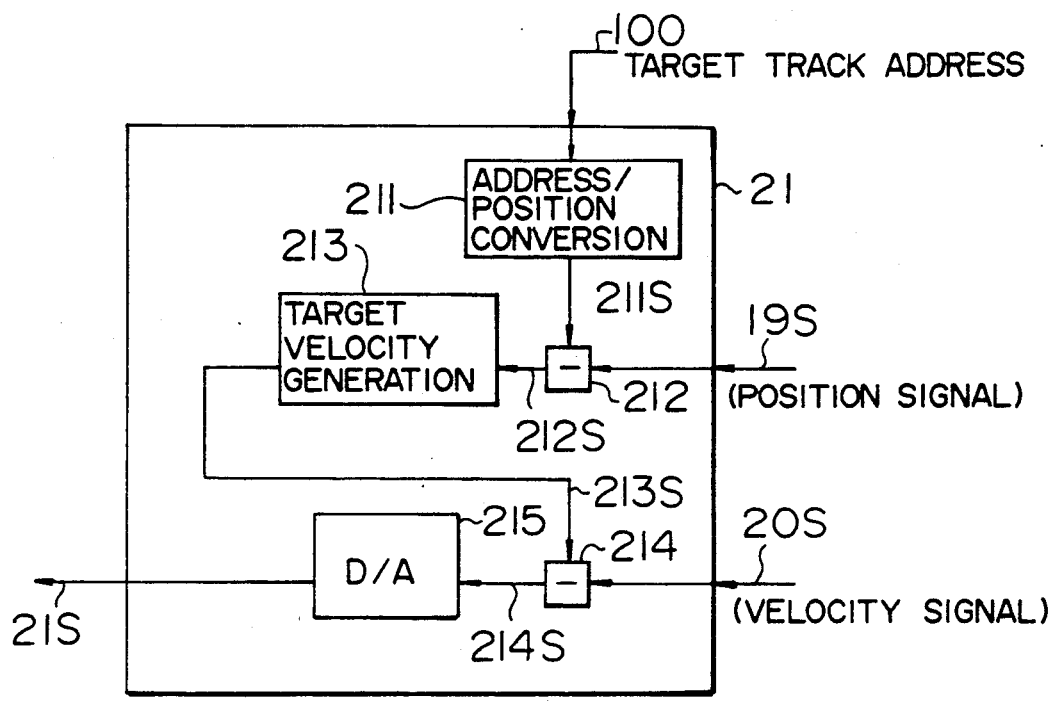
FIG. 7a is a block diagram for explaining the VCM velocity control circuit in FIG. 4.
Figure 7B:
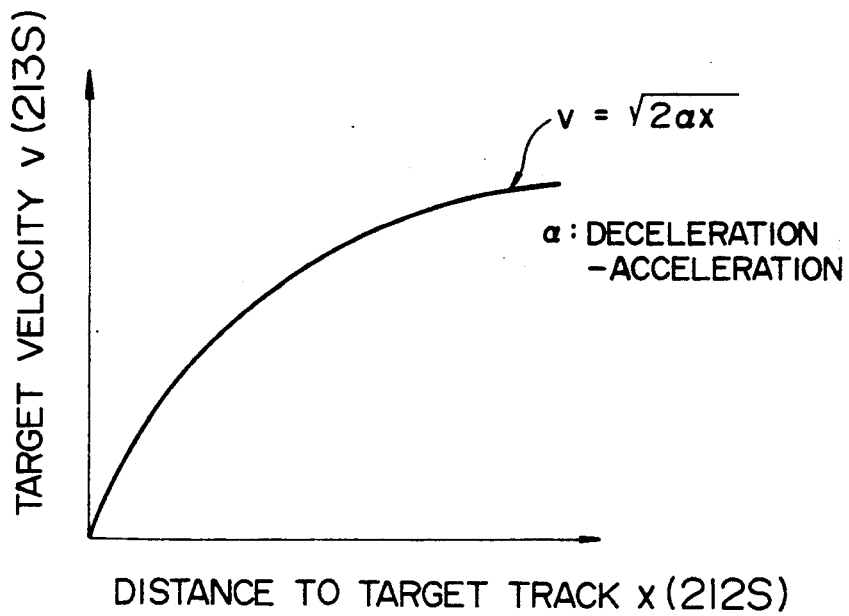
FIG. 7b is a graph showing the relation between the target velocity and the distance to the target track.

FIG. 7a is a scheme for explaining a general VCM velocity control circuit, which is indicated by 21 in FIG. 4 and FIG. 7b is a scheme for explaining a target velocity curve generated by an inner target velocity generator 213. At first, when a higher rank control circuit (not shown in the figure) gives the VCM velocity control circuit 21 a target track address (100), it is transformed into absolute position information 211S, to which the head should arrive, by an address/position converter 211 and the distance 212S to the target track is obtained by forming the difference between the absolute position information 211S and the head position signal 19S obtained from the head. The target velocity generator 213 generates the target velocity signal for the VCM, responding to the distance signal 212S to the target track. FIG. 7b is a graph showing an example of the relation between that input 212S and the target velocity signal 213S. Basically, representing the distance to the target track by x and the target velocity by v, and supposing that the head is decelerated with a constant acceleration a, a relationship expressed by:

$$v = \sqrt{2ax}$$

is generally used. On the basis thereof, more or less modifications are added in practice. Further, for the target velocity generator for obtaining v, starting from x described above, there are known a method, by which operation formulas are calculated successively, and a method, by which a velocity table is previously prepared, using the memory, and v is obtained by searching the table, using x. The more suitable method is selected so as to have a good balance among the operation time, the precision, etc. The generated target velocity 213S is compared with the velocity signal 20S obtained from the head and the difference 214S thus obtained is converted into an analogue signal by a D/A converter 215 to obtain the signal 21S for the velocity control.

Then, in FIG. 4, in the VCM driving circuit 22 the signal 21S is transformed into a current driving signal 22S for driving the VCM. The group of heads 7 is positioned on the target track through the VCM, responding to this driving signal 22S.

Further, the control signal 17S for the signal switching-over circuit is obtained from a head switching-over timing generating circuit 18 on the basis of a reproduced signal 11a from one of the disk surfaces serving as the reference. In addition, control signals 18a and 18b for the sample and hold circuit 14 and the A/D converter 15, respectively, are generated by a sample timing generating circuit 18, in which the position error signal 12S and the control signal 17S are inputted.

In the example indicated in FIG. 6, since the head traverses 2 tracks (40 μm) in a time of about 3Δt (about 30 μs), the cross track velocity along the head trajectory 3L is about 1.29 m/s. It is possible to monitor the head position and the velocity by counting zero cross points of the rectangular wave indicated by the full line in the lower part of FIG. 6. Here it can be thought that the highest detectable velocity $v_{max}$ can be expressed by:

$$v_{max} = (\text{track pitch})/(\text{sampling period of position information})$$

The trajectory 3L' of the head indicated in FIG. 6 corresponds to the case of the highest traverse velocity, below which the position and the velocity can be detected by counting the zero cross points and this track traverse velocity is 1.92 m/s. Further the trajectory 3L" corresponds the highest velocity, below which the detection of the velocity is made possible by using the four sorts of track patterns together. In this case, in the present embodiment, the detection of the head position is possible up to a traverse velocity of 7.68 m/s. In general, for a disk having a maximum displacement stroke of 30 mm, since the maximum head velocity, in the case where an average macro seek time of 10 ms is realized, is about 2 m/s, according to the present invention, this specification is realizable without using any special pattern such as the gray code. On the contrary, the highest detectable traverse velocity in the case of the sampling at a single face is 0.12 m/s, in the case where zero cross points are counted, and 0.48 m/s (corresponding to an average macro seek time of about 80 ms), even in the case where 4 track patterns are used together. Thus it can be understood that the power for detecting the position and the velocity can be increased remarkably according to the present invention.

Figure 2A:
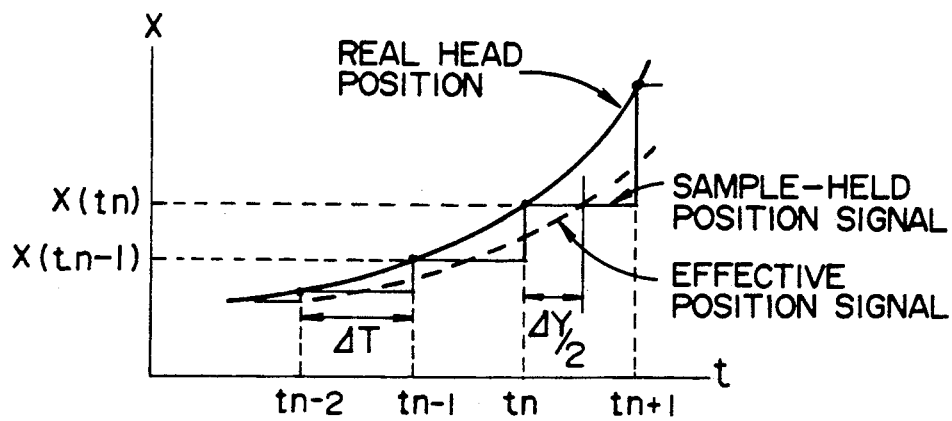
FIGS. 2a to 2c, are conceptual schemes for explaining the time lag due to the sampling.
Figure 2B:
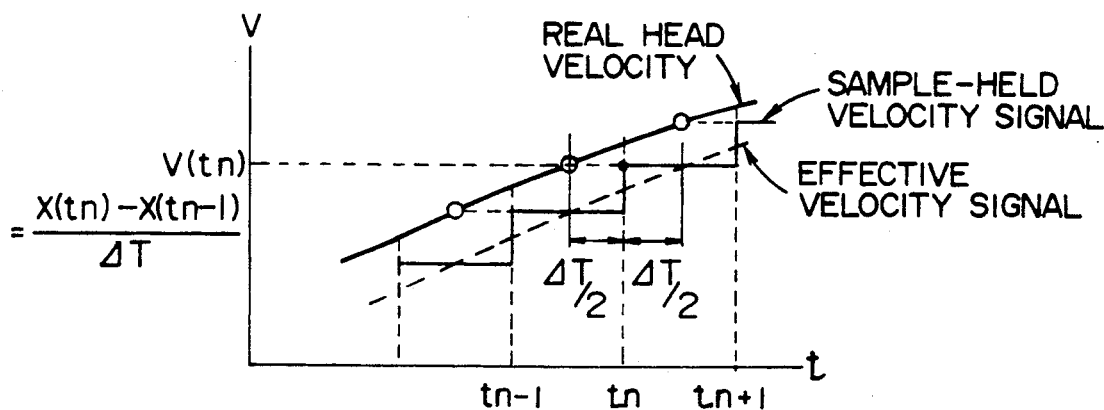
Figure 2C:
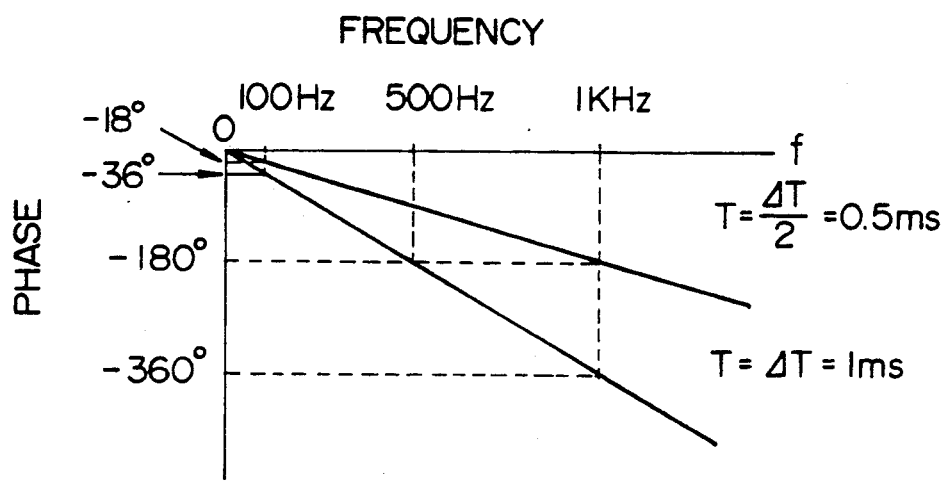
Figure 3A:
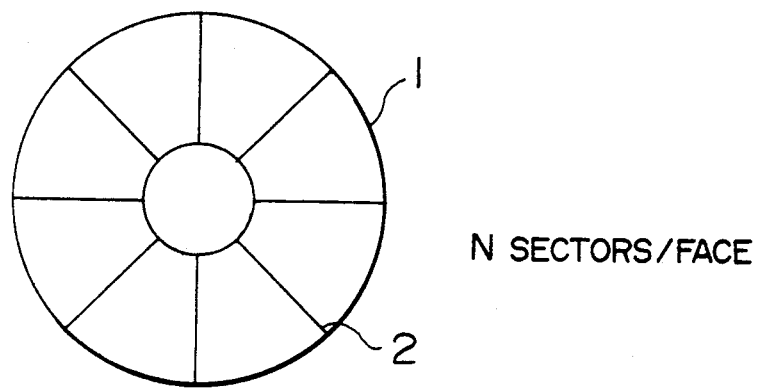
FIGS. 3a and 3b are schemes illustrating the construction of the present invention.
Figure 3B:
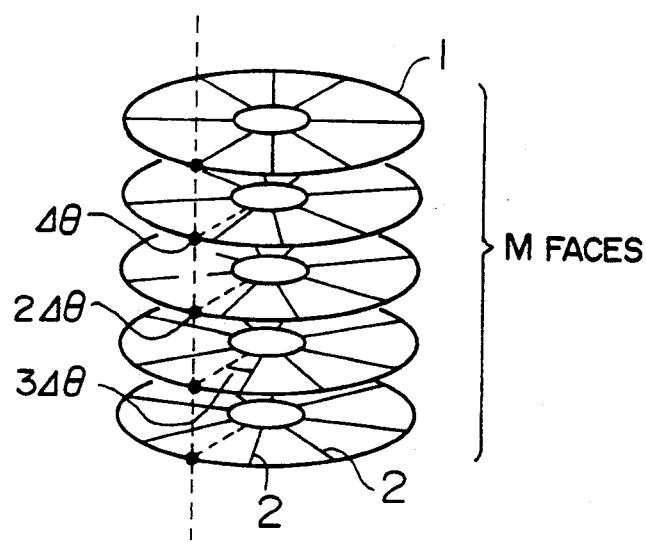

FIG. 8 is a graph, in which the phase lags of the servo signal obtained by sampling according to the present embodiment (16 faces) corresponding to FIG. 2c and according to the prior art method (a single face) are plotted in a log-log graph. The full lines represent the position signal and the broken lines the velocity signal. According thereto, in the case of the present embodiment, the frequency, above which the phase lag is greater than 10°, is below about 5.4 kHz for the position detection and about 2.7 kHz for the velocity detection. On the contrary, in the case where a single face is used, it is about 350 Hz for the position detection and about 170 Hz for the velocity detection. This is true also in the case where a special pattern such as the gray code is used. In the case where a system having an average macro seek time of about 10 ms, since a servo frequency band width of several hundreds of Herz for the velocity control system is required, it is very difficult to realize by the conventional method. On the contrary it can be shown that it is made satisfactorily possible according to the present method.

Figure 9:
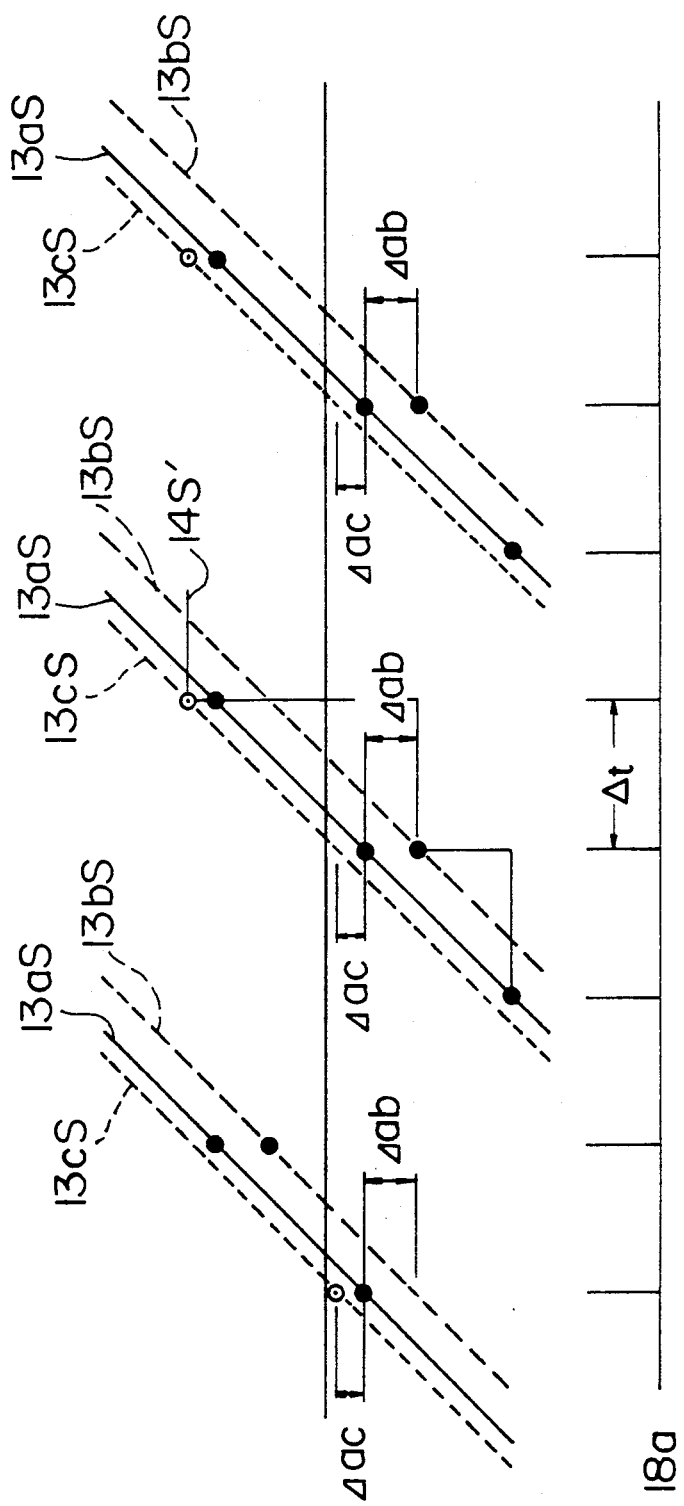

Next the correction of deviations between different heads due to variations in the course of time such as thermal displacements. As indicated also in FIG. 4, 16 heads are secured to the carriage 4 and they are moved at the seek, linked with the carriage. However, because of variations in the course of time such as thermal displacements, the positional relationship among them can vary. FIG. 9 shows position error signals 13aS, 13bS and 13cS at the track traverse by the method according to the present invention, in the case where deviations are produced among three heads A, B and C. Here it is supposed that there exist a positional deviation of Δab between the heads A and B and a positional deviation of Δac between the heads A and C. By this method, since the position signals of the heads are sampled by the signal 18a (refer to FIG. 4) in the order of A→B→C→ - - -, signal waveforms including deviations proper to the different heads such as a full line 14S′ are formed in this case. However, deviation amounts such as Δab, Δac, etc. can be restricted within several microns, in the case where the displacement velocity of the heads is low, these influences cannot be neglected. It is the precise detection of the velocity during the displacement of the heads that is important for the seek control. In the present embodiment attention is paid to the fact that, even if there exist positional deviations due to thermal displacements, etc. among the heads on different medium faces, the head velocity information detected for each of a plurality of faces contains no influences of the positional deviations, if the velocity of the head is calculated by using the position information within a same medium face. In the present embodiment, the equivalent sampling frequency is increased by calculating the velocity signal, based on the position information from each of the single faces and obtaining the velocity information from each of the faces for every period of time Δt.

Figure 11A:
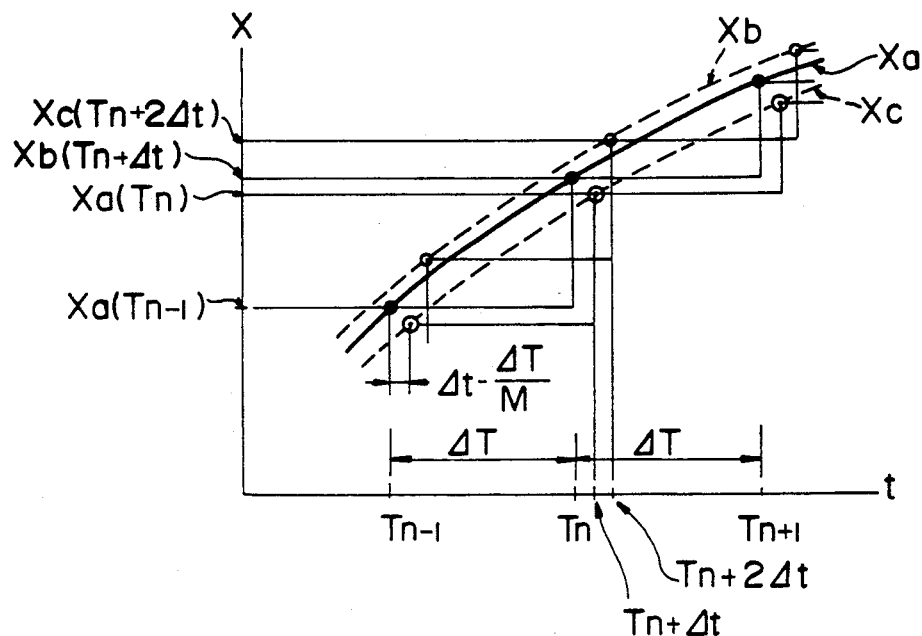
FIGS. 11a and 11b are graphs for explaining another embodiment of the present invention.
Figure 11B:
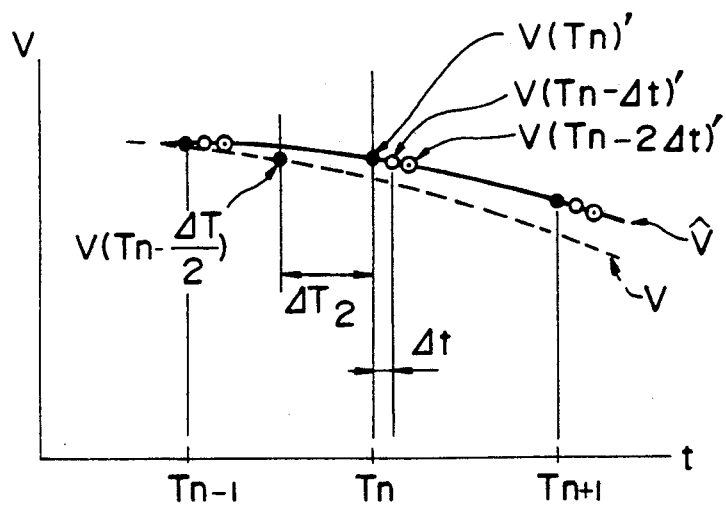

FIGS. 11a and 11b are schemes for explaining the principle of the present embodiment. In FIG. 11a, curves, Xa, Xb and Xc represent variations in the position of the heads A, B and C, respectively, in the course of time and it is supposed that among these three trajectories there exist positional deviations due to thermal displacements. Further it is supposed that the following relation are valid:

$$\Delta T = \tau/N$$

$$\Delta t = \Delta T/M$$

where N represents the number of sectors in one face of one disk; M the number of disk faces; and t the rotation period of the disks. When the numerical values in TABLE 1 are applied thereto, ΔT=166.7 μs and Δt=10.4 μs. Here a velocity information $$V(T_n)' = \frac{X_a(T_n) - X_a(T_{n-1})}{\Delta T}$$

is obtained from the head A at a point of time $T_n$ and subsequently from the head B at a point of time $T_n + \Delta t$ $$V(T_n + \Delta t)' = \frac{X_b(T_n + \Delta t) - X_b(T_{n-1} + \Delta t)}{\Delta T}$$

is obtained. In this way velocity information $V(T_n)'$, $V(T_n + \Delta t)'$, $V(T_n + 2\Delta t)'$, - - - are obtained one after another from the different faces. The velocity signal of the heads is obtained by connecting these signals, as indicated in FIG. 11b. The velocity calculation as described above is carried out in a velocity calculating section within the calculating circuit in FIG. 4.

Further, by the present method, for the head position information for searching the target velocity for every Δt (corresponding to 212S in FIG. 7) it is easy to use only the head position information coming from the objective disk face. However, since it can be impossible to monitor the absolute position of the heads by using only the position information coming from a single face, when the heads move with a high velocity, it is necessary to detect the position by connecting the position information coming from a plurality of faces, as indicated in FIG. 6.

By the method disclosed in the present embodiment, since the detection of the velocity information is effected within each of the faces, the phase lag due to the time lag is great. That is, as indicated in FIG. 11a, it can be thought that e.g. the velocity information $V(T_n')$ calculated at a point of time $T_n$ is a value obtained by detecting the velocity at the middle point between two points of time $T_n - \Delta T$ and $T_n$ with a time lag of $\Delta T/2$. Consequently the detected velocity $\hat{v}$ has a time lag of $\Delta T/2$ with respect to the real velocity v. This time lag is M times as long as that required, when the position information from a plurality of faces is used, as indicated in FIG. 6. However, since the sampling frequency for the velocity information remains same, the time lag in this case is Δt/2. Consequently the total time lag in the present embodiment is expressed by:

$$(\Delta T/2) + (\Delta t/2) = \Delta T(M+1)/2M.$$

On the contrary, the total time lag by the prior art method, by which a single surface is used, is expressed by:

$$(\Delta T/2) + (\Delta T/2) = \Delta T.$$

Consequently, by the present method, the time lag can be reduced by a factor of (M+1)/2M and thus when M is sufficiently great with respect to 1, i.e. when the number of disk faces is sufficiently great, the time lag can be reduced to about a half.

Figure 12:
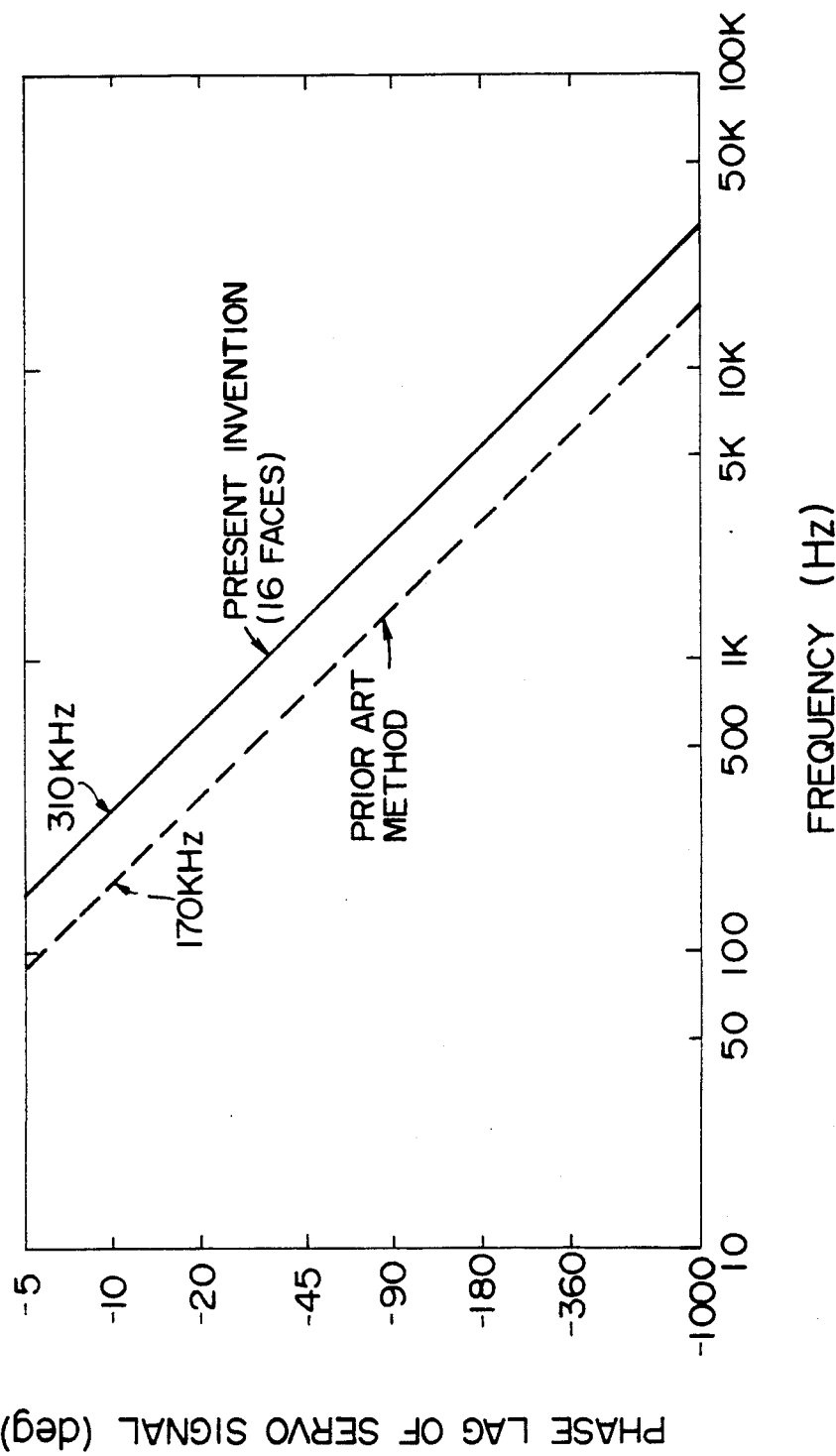
FIG. 12 is a graph for explaining the effect of the another embodiment of the present invention.

FIG. 12 shows a curve obtained by plotting the characteristics of frequency of velocity signal-phase, in the case where the numerical values indicated in TABLE 1 are applied to the method according to the present embodiment. When this method is compared with the method, by which a single face is used, by the present method the frequency, at which the phase lag due to the time lag is 10°, is about 310 Hz and on the contrary, by the method, by which a single surface is used, it is about 170 Hz. The phase lag at the neighborhood of this frequency has remarkable influences on the servo band width of the velocity control system and by using the present method it is possible to increase the velocity control frequency band width by a factor of about 2 and to perform the seek with a high speed.

A merit of the present embodiment is that even if deviations in the excentricity or deviations in the radial position of the heads between different disk faces are produced by thermal displacements in the mechanical system, it is hardly influenced by them. This has an advantage that precise positioning is possible at the low speed seek. Therefore, only at the low speed seek the detection of the velocity information may be effected within each of the faces.

EMBODIMENT 2

Now an embodiment is shown, in which numerical corrections on the position information are effected further during the seek in order to remove influences of the positional deviations between different heads.

FIG. 10 shows a table indicating an example of the memory, in which correction values for removing the positional deviations are stored. A, B, C, - - -, P represent the heads. Here it is supposed that the reference head is the head A and relative deviations of the other heads with respect to the head A, indicated by $\Delta ab$, $\Delta ac$, $\Delta ad$, - - -, $\Delta ao$, $\Delta ap$, are stored. Before the seek a following operation is effected previously only with the servo signal coming from the head A; the deviations from the head A are measured by using the position error signal for each of the head at that time; and the average value is stored in a memory within the calculating circuit 16 for each of the heads and each of zones as the relative errors such as $\Delta ab$, $\Delta ac$, $\Delta ad$, - - -, etc. The error $\Delta aa$ for the head A itself is zero. The position information of the heads successively sampled at the seek is corrected by using the values stored in the memory for each of the heads and each of the zones in the radial direction of the disks. For example, in the case where the head B is sought, for the position information $Xa(T_n)$, $Xb(t_{n+1})$, $Xc(t_{n+2})$, - - - from the heads A, B, C, - - -, correction processings represented by;

$$Xb(t_n) = Xa(t_n) - (\Delta ab - \Delta aa)$$
$$Xb(t_{n+1}) = Xb(t_{n+1}) - (\Delta ab - \Delta ab)$$
$$Xb(t_{n+2}) = Xc(t_{n+2}) - (\Delta ab - \Delta ac)$$

are carried out and the head velocity at the seek is calculated by using the position information after the correction in the left members. These correction processings are carried out in the calculating circuit 16. It is desirable that the correction processings are carried out, when measuring instruments for the correction values stored in the memory execute no operations such as seek, recording, reproducing, erasing, etc. or just before the start of the seek. Further, in the case where the eccentricity is different for different disks and influences thereof cannot be neglected, the memory for storing errors due to the eccentricity may be secured for one turn for each of the heads and correction processings similar to those described above may be carried out for every rotation angle. By carrying out such correction processings it is possible to monitor the head velocity with an interval of 10.4 $\mu s$ ($\Delta t$) also at the deceleration of the heads and to effect an access with a high speed. The other components are identical to those described in EMBODIMENT 1.

EMBODIMENT 3

Figure 13:
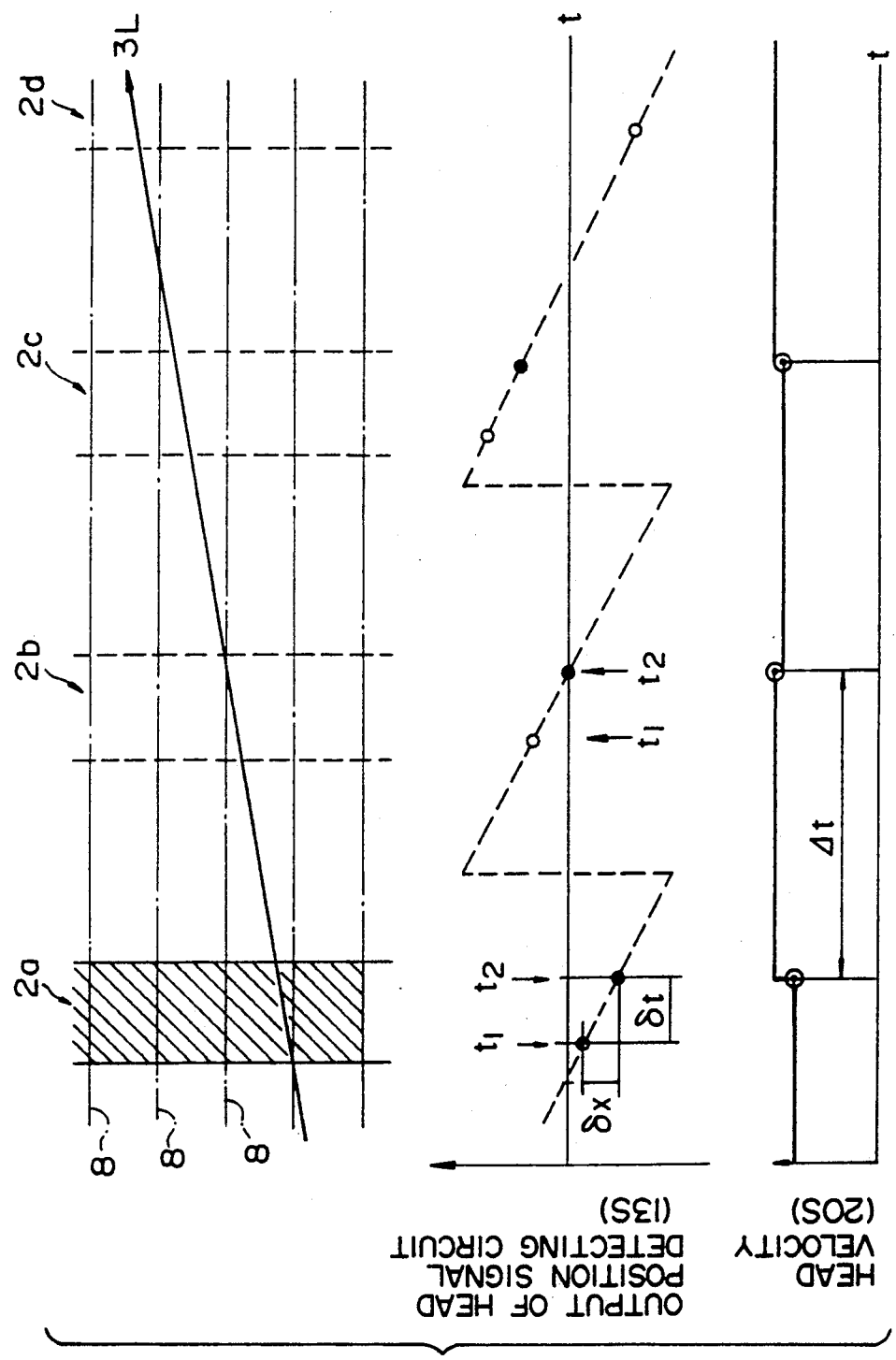
FIG. 13 is a conceptual scheme for explaining still another embodiment of the present invention.

Next the third embodiment will be explained, referring to FIG. 13. In EMBODIMENTS 1 and 2 the velocity information has been obtained by dividing the positional displacement of the head between servo fields by the time ($\Delta T$ or $\Delta t$) between the servo fields. In the present embodiment the time lag accompanied by the velocity detection is further reduced by executing this velocity detection within a single servo field. FIG. 13 corresponds to FIG. 6, but it is drawn with a horizontal scale enlarged with respect to that of FIG. 6. 2a, 2b, 2c, - - - indicate servo fields and 3L represents a head traversing tracks 8. The saw-toothed wave indicated in the middle part of FIG. 13 represents the output signal of the head position signal detecting circuit 13. In the present embodiment the position signal is sampled at two points ($t_1$, $t_2$) within a single servo field. The head velocity ($\delta x/\delta t$) is obtained from the positional displacement ($\delta x$) during this period of time ($\delta t$). This velocity calculation is carried out successively in time sharing for every $\Delta t$ in the servo field on each of the faces. In this way a head velocity signal, as indicated in the lower part of FIG. 13, is obtained by connecting the velocity information obtained successively for every $\Delta t$.

By the method used in the present embodiment, since it is necessary to detect the head velocity within a single servo field, although it can take place that it is required to lengthen somewhat the servo pattern, it is possible to reduce further remarkably the time lag produced because of the fact that it is necessary to wait for a time corresponding to the interval between two servo fields in EMBODIMENTS 1 and 2, when a velocity information is detected. Further this method has a merit that it is not subjected to influences of position errors between different disks.

According to the present method, also in an embedded servo type magnetic disk drive unit, since it is possible to raise equivalently the sampling frequency and to increase the servo frequency bandwidth of the velocity control system of the seek, the seeking time can be shortened up to the same degree as by the prior art dedicated servo method. In the embodiments no example of the case where track identification signals such as the gray code are used together is described, because the use of the gray code method together is not essential for the present invention. That is, the difference is only that the confirmation of the head position at the high speed seek is effected while counting the number of tracks one by one or it is carried out directly by reading out the address and the gray code method corresponds to the latter. If the gray code method is used together with the present invention, although overhead increases more or less, the confirmation of the head position becomes easier. However, according to the present invention, since the sampling of the position information is effected finely, even if the seek speed is increased, it is not always necessary to use the gray code method, but it is possible to confirm satisfactorily the position by using a simple servo pattern.

EMBODIMENT 4

Subsequently another embodiment of the present invention will be described. In the preceding embodiments it was supposed that the detection of the velocity information from the position signal is effected in all the cases according to Eq. (1). However, since the velocity calculation using Eq. (1) uses only information determined in the past, the time lag takes place because of the fact that the velocity detected at the point of time $T_n$ is a velocity in the past earlier by $\Delta T/2$. This time lag can be remarkably reduced by adopting a method using extrapolation. Further it is possible also to improve further the power of the drive unit by combining the present embodiment with EMBODIMENT 1, 2, or 3.

Figure 14:
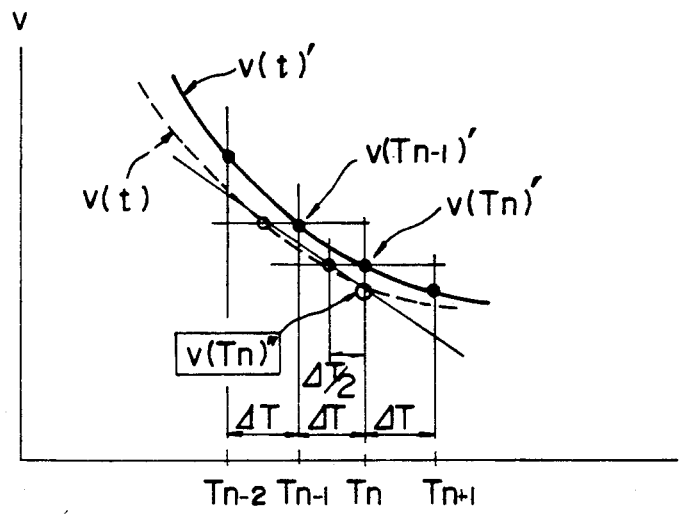
FIG. 14 is a graph showing the relation between the velocity and the time for explaining a method for obtaining the velocity by extrapolation.

FIG. 14 is a scheme for explaining the case where the head velocity $V(T_n)$ is calculated by extrapolation. $V(t)$ indicated by a broken line represents a real velocity curve of a head and $V(t)'$ shows continuously the velocity calculated by using Eq. (1). The sampling interval is $\Delta T$ and there exists a time lag of $\Delta T/2$ between $V(t)$ and V(t)'. Denoting the present point of time by $T_n$, if it is supposed that the determined velocity information $V(T_n)'$ and $V(T_{n-1})'$ corresponds to the velocities $V(T_n-\Delta T/2)$ and $V(T_{n-1}-\Delta T/2)$, respectively, obtained by retarding the real head velocity by $\Delta T/2$, it can be presumed that the real velocity $V(T_n)$ at the point of time $T_n$ can be approximated by the point $V(T_n)''$, which is on the line connecting $V(T_n-\Delta T/2)$ and $V(T_{n-1}-\Delta T/2)$ elongated to $T_n$. Consequently by utilizing the relation of $V(T_n)'=V(T_n-\Delta T/2)$, and $V(T_{n-1})'=V(T_{n-1}-\Delta T/2)$ the velocity $V(T_n)$ given by;

$$V(T_n)'' = \frac{3}{2} V(T_n)' - \frac{1}{2} V(T_{n-1}) \qquad (2)$$

can be used as the velocity at the point of time $T_n$. Therefore it is possible to reduce influences of the time lag by using Eq. (2) as the velocity calculating formula.

EMBODIMENT 5

Although EMBODIMENT 4 describes a case where the extrapolation for obtaining the velocity is used only with the information obtained from the disk, it is possible also to use the VCM driving current, which is utilized often for monitoring the head velocity. That is, since the VCM driving current corresponds to be acceleration of the head, it is utilized that a kind of the velocity signal is obtained by integrating the current intensity. Integrating the VCM driving current by $I(t)$ and using the notations in FIG. 13, the following formula is obtained;

$$V(T_n)'' = V(T_n)' + \int_{T_n - \Delta T/2}^{T_n} I(t)dt \qquad (3)$$

or $$V(T_n)'' = V(T_n)' + \frac{1}{2} \int_{T_{n-1}}^{T_n} I(t)dt \qquad (4)$$

Figure 15:
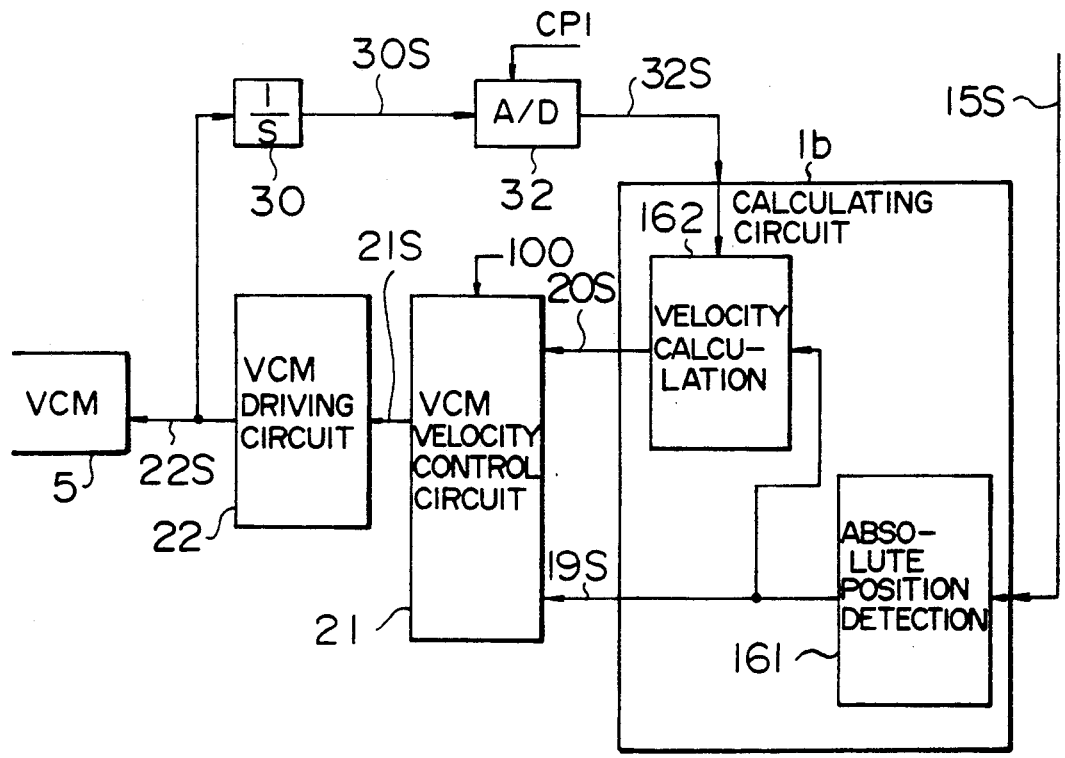
FIG. 15 is a block diagram for explaining still another embodiment of the present invention.

The second term is the part for obtaining the varying velocity component $\Delta V$ during a period of time of $\Delta T/2$ from the VCM driving current. In Eq. (4) the integral domain is $\Delta T$ and the value of integration is multiplied by 0.5. Therefore it is almost equivalent to Eq. (3). Further, since for Eq. (4) it is not necessary to generate the timing of $\Delta T/2$, it can be easier to realize. Either one of them, e.g., the one which is more suitable, may be used. FIG. 15 shows a part of the construction of the driving unit, in which Eq. (3) or (4) is used, and the other part, which is not indicated in this figure, is identical to the corresponding part in FIG. 4. However the part in FIG. 4, in which the servo signals from the plurality of heads are switched-over in time sharing, is not always necessary. The output current 22S of the VCM driving circuit 22 is integrated in an integrating circuit 30 to obtain a quasi velocity signal 30S. It can be thought that the quasi velocity signal 30S represents the velocity of the head. However, since it is obtained by integration, the bias component corresponding to the integration constant is not determined. Therefore the second term is obtained by a definite integration of a signal 32S obtained by A/D transforming it from the point of time $(T_n-\Delta T/2)$ to $T_n$ in the calculating circuit 16. Denoting the output of the A/D converter at the point of time $(T_n-\Delta T/2)$ by $Y(T_n-\Delta T/2)$ and the output at the point of time $T_n$ by $Y(T_n)$, since the value of this definite integration V is given by;

$$\Delta V = Y(T_n) - Y(T_n - \Delta T/2),$$

Eq. (3) can be transformed into;

$$\begin{aligned} V(T_n)'' &= V(T_n)' + \Delta V \\ &= V(T_n)' + Y(T_n) - Y(T_n - \Delta T/2) \end{aligned} \qquad (5)$$

In the same way Eq. (4) can be expressed by;

$$\begin{aligned} V(T_n)'' &= V(T_n)' + \Delta V \\ &= V(T_n)' + 0.5(Y(T_n) - Y(T_{n-1})) \end{aligned} \qquad (6)$$

The calculation of these Eqs. (5) and (6) is carried out in the velocity calculating section within the calculating circuit 16 at the same time as the calculation of $V(T_n)$. It is a matter of course that it is possible to A/D convert directly the VCM driving current and to execute operations such as the integration, etc. in the digital form.

Different extrapolation methods other than such an extrapolation method for obtaining the velocity are conceivable. The velocity extrapolation is useful for reducing influences of not only the time lag produced, when the velocity is obtained from the sampled position information, but also the time lag produced by calculation time, etc. and can increase further the effect of the present invention.

EMBODIMENT 6

Figure 16A:
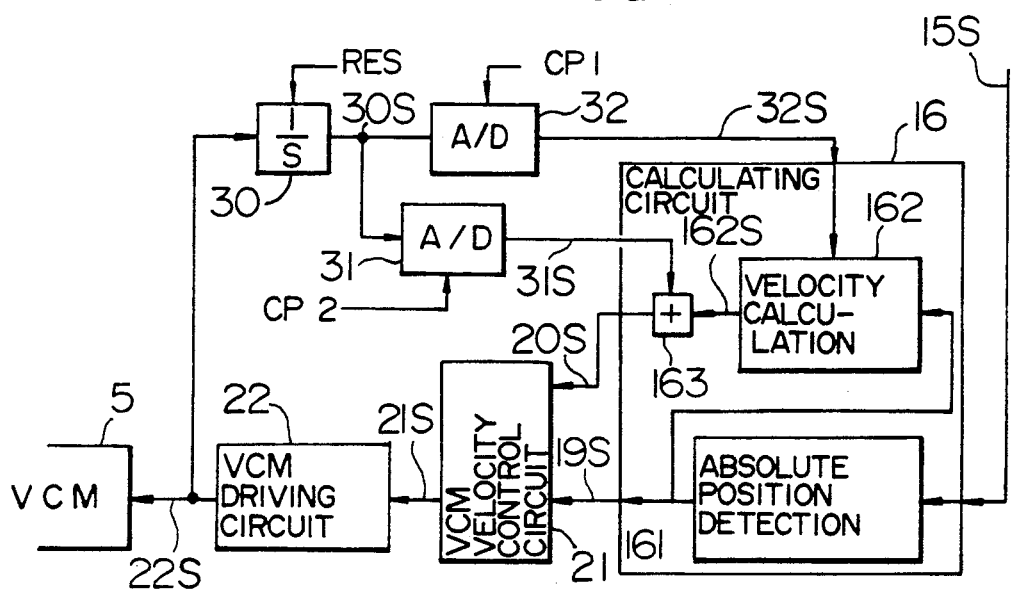
FIG. 16a is a block diagram for explaining the construction of still another embodiment of the present invention.
Figure 16B:
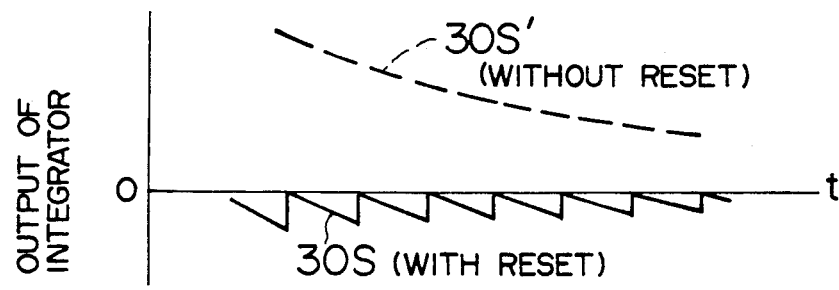
Figure 16C:
Figure 16D:
Figure 16E:
Figure 16F:
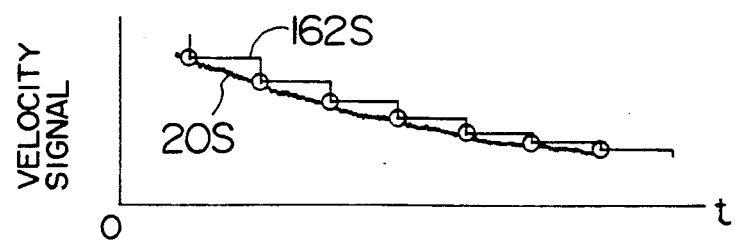
Figure 17A:
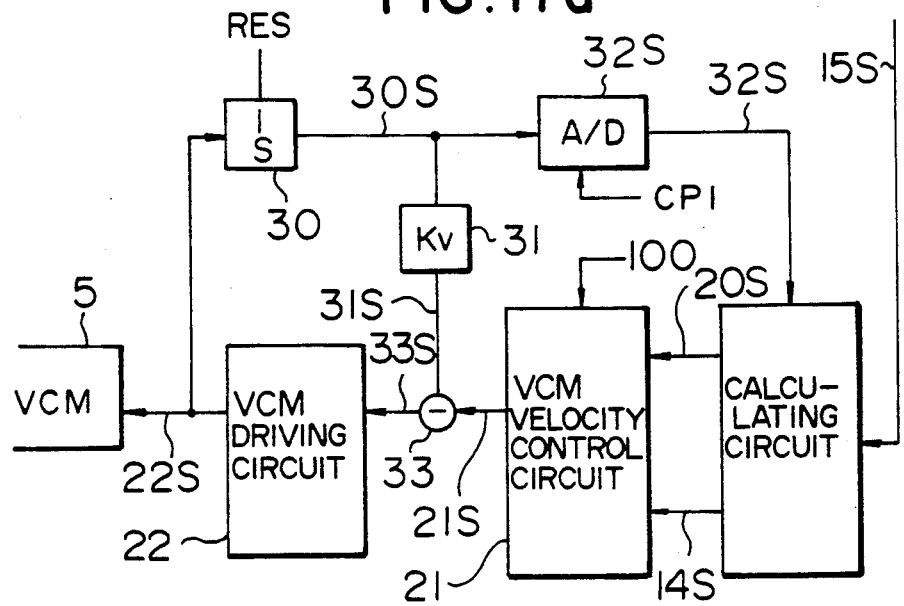
FIG. 17a is a block diagram for explaining the construction of still another embodiment of the present invention.
Figure 17B:
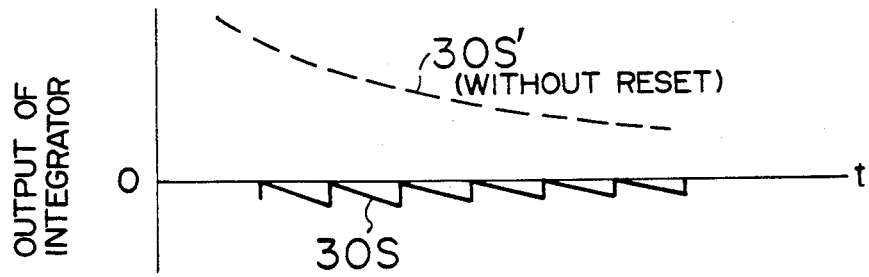
Figure 17C:
Figure 17D:
Figure 17E:
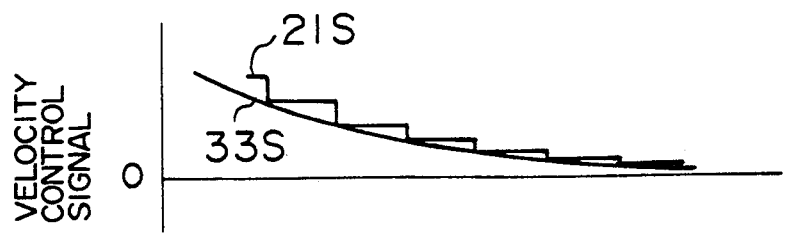

Now an embodiment will be described, in which the velocity signal is smoothed by using the VCM driving signal. FIGS. 16a to 16f are schemes for explaining a first embodiment for the smoothing. FIG. 16a is a block diagram of the driving unit. Just as FIG. 15, this figure illustrates modifications around the VCM driving circuit 22 in FIG. 4 and the other part is basically identical to that indicated in FIG. 4. In FIG. 16a, the VCM driving signal 22S is integrated in the integrator 30 in an analogue form to obtain the quasi velocity signal 30S. The integrator 30 has a reset terminal and the output thereof becomes 0 by a reset pulse indicated in FIG. 16c. The pulse interval of reset pulses is $\Delta T$. FIG. 16b indicates the output of the integrator at the VCM deceleration, where 30S' represents a hypothetical signal waveform without reset and 30S shows the real saw-toothed waveform, for which reset is effected. The quasi velocity signal 30S is is inputted in two A/D converters 31 and 32. Here the A/D converter 32 works in the same way as that in the embodiment indicated in FIG. 15. That is, it is used for extrapolating the velocity signal. Here, since Eq. (3) stated above is used as the extrapolation formula, the period of the converting pulse CP1 for the A/D converter 32 is $\Delta T/2$, as indicated in FIG. 16d. On the other hand, the A/D converter 31 represents the feature of the present embodiment and as indicated in FIG. 16e, the conversion period $\delta t$ of the converting pulse CP2 is as small as possible with respect to $\Delta T/2$. As the result, since the output 31S of the A/D converter 31 samples finely the output 30S of the integrator, it is possible to obtain information on fine variations of the velocity. Consequently since a stepwise signal 162S, for which the extrapolation processing has been effected, is obtained as indicated in the preceding embodiment, it is possible to obtain a smooth velocity signal waveform 20S by smoothing the stepwise waveform 162S, as indicated in FIG. 16f, by adding the output 31S of the A/D converter 31 to the stepwise velocity signal 162S in an adder section 163. Although in reality the signals 31S, 162S and 20S are digital signals, they are indicated in FIG. 16f as analogue signals for the explanations' sake.

In the above an embodiment concerning the smoothing of the velocity signal has been described. In the present embodiment, since the velocity signal obtained by making the period δt of the converting pulse CP2 for the A/D converter more fine is almost as smooth as that obtained by the general continuous servo method, it is possible to reduce the time lag. In the present embodiment, at the comparison of the velocity signal with the target velocity effected within the VCM velocity control circuit 21, it is necessary that the target velocity (213S in FIG. 7b) has also a resolving power as high as the velocity signal As described above, in EMBODIMENT 6, the smoothing of the velocity signal is effected by A/D converting once the output of the integrator with a high speed and adding the result thus obtained to the stepwise signal in the digital form.

EMBODIMENT 7

Now the seventh embodiment will be explained, referring to FIGS. 17a to 17e. In the seventh embodiment, the output 30S of the integrator is added to the output (analogue signal) 21S of the VCM velocity control circuit in an analogue adder 33 after having adjusted the output level thereof by means of a coefficient multiplier (for example, an speeking amplifier or attenuator) 31 to obtain the velocity control signal 33S. FIGS. 17b to 17e show signal waveforms thereof, which are almost identical to those indicated in FIGS. 16b to 16e. The difference consists in that variations in the quasi velocity signal obtained from the VCM driving current are added to the stepwise analogue velocity control signal waveform obtained as the result of the comparison with the target velocity in the analogue form.

In the present embodiment, since the addition for the smoothing is effected with an analogue signal, an advantage is obtained that the extra A/D converter is not necessary and that it is not necessary to make the resolving power of the target velocity excessively high.

In the above, the present invention has been explained in detail. According to the present invention, in an embedded servo type magnetic drive unit, since it is possible to reduce the time lags produced at sampling a dispersed signal and at calculating the velocity signal from the information obtained by the sampling, it is possible to realize a high speed seek control system. Further, since the these features of the present invention are independent from each other, the effects of these features are added to each other by constructing a velocity control system by combining them and thus it is possible to constitute a seek control system having improved characteristics.

What is claimed is:

1. A disk control method for driving a disk drive unit comprising;
   a disk set including M disk faces, M being greater than 2, in each of which information tracks are formed in concentric circles or in a spiral and servo signals are recorded in N sectorial regions obtained by dividing uniformly the periphery into N sections;
   a spindle mechanism for rotating disks, linked with each other;
   means for rotating said spindle mechanism with a speed of one turn in a time τ
   a group of heads including at least M heads for detecting said servo signals from said M disk faces; and
   head moving means for moving said group of heads parallelly to said disk faces and in the radial direction of said disk faces, in which said servo signal fields on two disk faces in the up and down direction among said M disk faces are disposed, shifted by 360°/(M×N);
   output signals from said M heads are detected in time sharing;
   the head displacement velocity is calculated for every time τ/N on the basis of more than two position signals at different points of time within a same disk face;
   velocity information is obtained by switching-over head displacement velocities coming from different disk faces for every time τ/(M×N), and
   the velocity control of said head moving means is controlled on the basis of said velocity information.

2. A disk drive unit comprising:
   a disk set including M disk faces, M being greater than 2, in each of which information tracks are formed in concentric circles or in a spiral and servo signals are recorded in N sectorial regions obtained by dividing uniformly the periphery into N sections;
   a spindle mechanism for rotating disks, linked with each other;
   means for rotating said spindle mechanism with a speed of one turn in a time τ;
   a group of head including at least M heads for detecting said servo signals from said M disk faces; and
   head moving means for moving said group of heads parallelly to said disk faces and in the radial direction of said disk faces, in which said servo signals fields on two disk faces in the up and down direction among said M disk faces are disposed, shifted by 360°/(M×N);
   means for detecting output signals from said M heads in time sharing;
   means for calculating the head displacement velocity for every time τ/N on the basis of more than two position signals at different points of time within a same disk face;
   means for obtaining velocity information by switching-over head displacement velocities coming from different disk faces for every time τ/(M×N), and
   means for controlling the velocity control of said head moving means on the basis of said velocity information.

3. A disk drive unit according to claim 2, wherein:
   the detecting means detects position signals of said heads at more than two previous times in the radial direction of said disks from said servo signals detected by said heads;
   the calculating means calculates average displacement velocities of the heads from said position signals are more than two previous times; and
   the velocity information means obtains a displacement velocity at an arbitrary point of time extrapolating said average displacement velocities in order to control the velocity of said heads through said head moving means on the basis of said displacement velocity obtained by extrapolation.

4. A disk drive unit according to claim 3, further comprising means for obtaining said displacement velocity at an arbitrary point of time, using said average displacement velocity and driving current for said head moving means.

5. A disk drive unit according to claim 2, wherein:

the detecting means detects position signals of said heads at more than two previous times in the radial direction of said disks from said servo signals detected by said heads;

the calculating means calculates displacement velocity information of the heads from said position signals at more than two previous times; and further comprising:

means for smoothing said displacement velocity information by using driving current for said head moving means in order to control the velocity of said heads through said head moving means on the basis of said displacement velocity information thus smoothed.

6. A disk drive unit according to claim 5, wherein said smoothing means includes an integrator for integrating the driving current of said head moving means; a converter for A/D converting the output of said integrator; and means for adding the output of said converter to said displacement velocity information in the digital form.

7. A disk drive unit according to claim 5, wherein said smoothing means includes an integrator for integrating the driving current of said head moving means; a coefficient multiplier for adjusting the output of said integrator; a VCM velocity control circuit for obtaining a velocity control signal from said displacement velocity information; and means for adding the output of said velocity control circuit to the output of said coefficient multiplier in the analogue form.

8. A disk drive unit according to claim 2, wherein the velocity information means obtains a displacement velocity at an arbitrary point of time by extrapolating average displacement velocities for controlling the velocity of the heads.

9. A disk drive unit according to claim 2, further comprising means for smoothing the displacement velocity information by using driving current for the head moving means for controlling the velocity of the heads.

* * * * *